INVENTOR.
Louis A. King
BY
Robert S. Dunham
ATTORNEY

Patented Dec. 9, 1952

2,621,300

UNITED STATES PATENT OFFICE 2,621,300

BALANCED SELF-COMPENSATING PHOTO-SENSITIVE CONTROL

Louis A. King, Wollaston, Mass., assignor to Infra Roast, Inc., Boston, Mass., a corporation of Massachusetts Application May 25, 1949, Serial No. 95,237

5 Claims. (Cl. 250—217)

This invention relates to control systems. More particularly the invention relates to the photoelectric detection and comparison of light intensities and to the provision of a balanced, self-compensating optical and electronic control system.

More particularly, the invention relates to a control system wherein a photocell is exposed for equal, alternate periods of time to light reflected from a standard source and to light reflected from a variable source, and has for its object the provision of a sensitive calibrated control system in which the optical scanning means is mounted in proximity to the variable source, such scanning means being protected from the heat and volatile or other foreign substances, and in which all of the possible sources of errors are eliminated. The optical scanning system is utilized to produce a substantially sinusoidal voltage whose alternating component is rectified, the resultant rectified voltage being utilized to trigger a control relay when the control source reaches a predetermined optimum condition.

It is a further object of this invention to provide an improved optical scanning system.

Light modulated photocell comparators have been utilized extensively in the arts. Such systems employ one or more photocells, the conductivity of a single photocell and its resultant output voltage at any given instant of time being directly proportional to the intensity of the light striking the photocell.

If light beams from two different sources are alternately projected on the photocell for equal periods of time, then the output of the photocell is a substantially sinusoidal voltage whose maximum value is proportional to the intensity of the light received by the photocell from one of the sources, initially a standard reflective source in the system described herein, and whose minimum value is proportional to the light received by the photocell from the other source, initially the reflective surface from the contents of the furnace in the system described herein.

When the intensities of the light striking the photocell from the two sources are equal, the alternating component of the photocell output will be at a minimum or null point, and if the relative source intensities are reversed in value, then the resultant output voltage of the photocell will correspondingly reverse or shift 180 degrees in phase.

If the two light sources consist of reflected light, and if the intensity of the light from the first reflective source be represented by A, then $$A = \frac{I_1 k_1 R_1}{d_{s1}^2 d_{r1}^2}$$

wherein, $I_1$ is the intensity of the original light source, $d_{s1}$ is the distance from the light source to the reflective surface, $d_{r1}$ is the distance from the reflective surface to the photocell, $k_1$ is a constant, and $R_1$ is the reflectivity coefficient of the surface used to reflect a portion of the light beam onto the photocell, said surface being a standard ball mirror in the system described herein.

Similarly, if B represents the intensity of the light striking the photocell from the second reflective source, then $$B = \frac{I_2 k_2 R_2}{d_{s2}^2 d_{r2}^2}$$

wherein, $I_2$ is the intensity of the original light source, $d_{s2}$ is the distance from the light source to the reflective surface, $d_{r2}$ is the distance from this reflective surface to the photocell, $k_2$ is a constant, and $R_2$ is the reflectivity coefficient of the surface utilized to reflect the light beam onto the photocell, this surface being that of the furnace contents in the system described herein.

If $I_1$ and $I_2$ are made identical by using a single source as in the hereindescribed system, and the ratio of $d_{s1}^2 d_{r1}^2$ to $d_{s2}^2 d_{r2}^2$ is substantially constant, then the ratio of A to B is equal to $$\frac{R_1}{R_2} \times \text{a constant}$$

The associated electronic circuits of the control system hereindescribed are designed to trigger when $A = B$. Therefore, if $R_2$, the reflectivity coefficient of the control source, increases to a desired optimum value, the attainment of this value can be detected by presetting $R_1$, the reflectivity coefficient of the standard calibrated ball mirror, to this desired optimum value and by maintaining it at this value throughout the controlled cycle.

Since the only optical source of error in such a system is $R_1$, the reflectivity coefficient of the standard ball mirror, it is essential that the value of this element be maintained constant throughout the cycle. It is, accordingly, a special object of this invention to provide simple, reliable means for maintaining this quality constant and for accurately adjusting its value, as is more fully explained below.

It is also essential to stabilized operation of such a system to utilize an associated electronic detection system which is independent of the frequency of light modulation, so that variations in this frequency will not affect the control system. Further, it is essential to provide an electronic control system which will not unduly load the photocell circuit, will provide high signal gain, and in which unavoidable random noise and amplifier distortion will be averaged out and the system automatically biased to compensate for these errors. It is an object of this invention to provide such an electronic system in the hereinbelow described null point detection control. It is to be noted that this system does away with the need for synchronous motors or for synchronous tube phasing.

This invention was conceived during the course of research relating to the control of coffee roasting cycles. It will be most convenient, therefore, to describe the control system as it relates to the sensing of conditions existing in furnaces or heated roasting chambers. The application of the control system is, however, general. Therefore, hereinafter the term "furnace" should be read to mean any control source capable of reflecting light, the intensity of which may be compared to a fixed intensity standard.

It has been proposed in the prior art to inspect the contents of a furnace by one of two means. The first such system consists of providing a window in the furnace and a photocell mounted at some distance from the furnace and in comparing the radiations given off by the furnace contents with light from a standard source. This system fails to provide an automatic compensation for changes in the intensity of the standard light source and in the reflectivity of its associated mirrors. In addition, such a system is totally unsuited to the control of a furnace whose contents are never heated to a sufficient temperature to give off any large amount of radiations. In the other prior art system samples of the contents of the furnace are removed from the furnace during the heating cycle for optical scanning. Such systems are inherently inaccurate because exposure to the atmosphere changes the temperature and reflectivity of the furnace contents. It is, therefore, a special object of this invention to provide a compensated, optical furnace control in which light reflected from the furnace contents during the heating cycle is utilized.

There are limitations to the obtainable signal to noise ratio from a light modulated scanning system, and since the obtainable signal intensity varies inversely with the square of the distance, even where a polarizing shutter is used, it is consequently necessary to place the optical scanning system in extremely close proximity to the furnace contents, particularly where such contents are either dark in color or have a highly irregular surface, or both, so that the reflectivity coefficient of such contents is relatively small. It is further desirable from a commercial and production standpoint to provide a furnace control which can be included with the furnace as a single compact unit.

Since the optical scanning system must be placed in close proximity to the furnace contents, it becomes necessary to protect this delicate system from the heat of the furnace and to protect it also from vapors and condensates. It is, accordingly, a special object of this invention to so protect the optical scanning system by providing an automatically operated gate mechanism which thoroughly insulates this system during all but a very short portion of the heating cycle and by providing a sealed, pressurized housing for the main optical unit.

For a more complete understanding of my invention reference should be had to the accompanying drawings of which Fig. 1 represents a schematic diagram of a preferred embodiment of the furnace control system;

Figure 1:
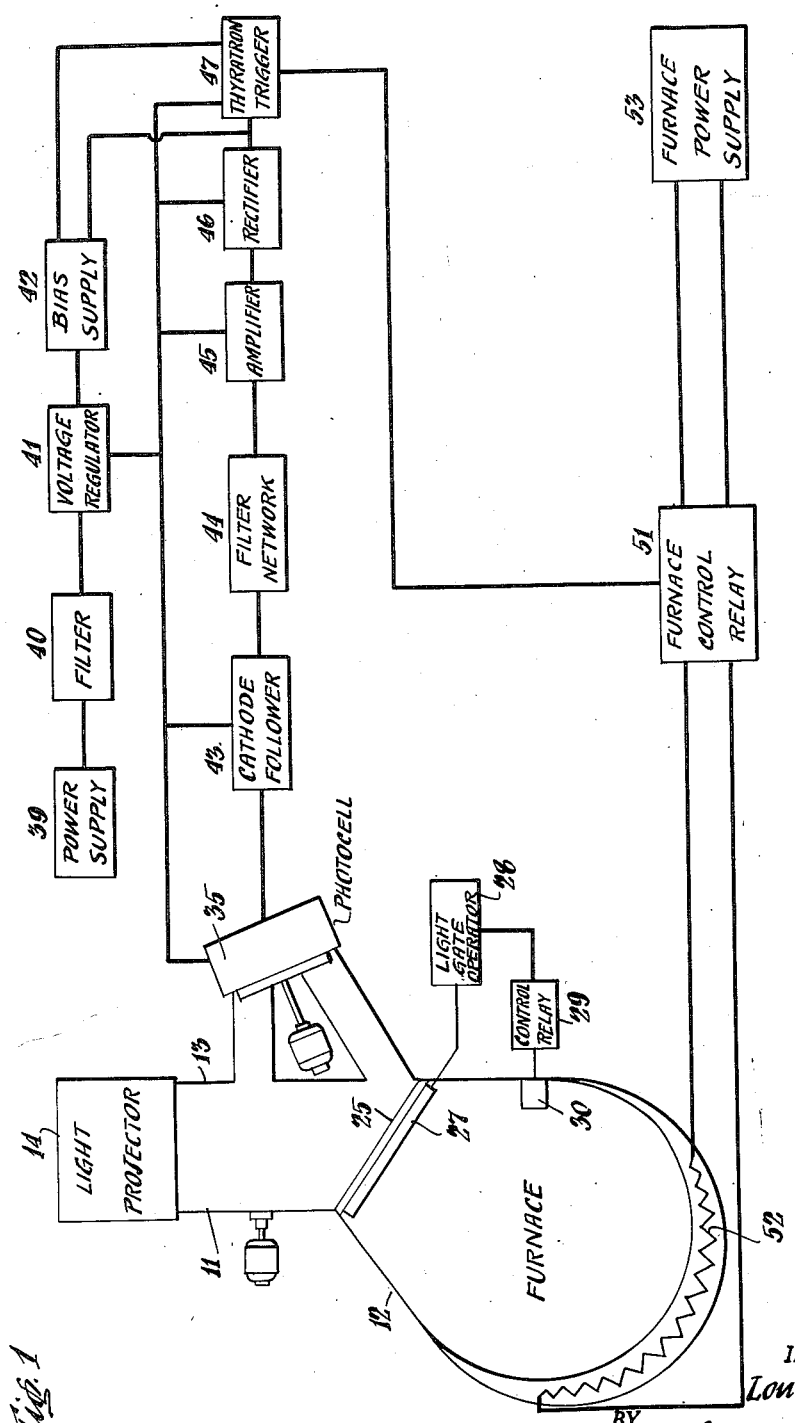

As shown in Fig. 1, the overall system of the invention may constitute a control for the supply of heat to a furnace 12, so as to terminate this supply when the contents of the furnace have reached an optimum condition.

To accomplish this result an optical scanning system 11 is integrally mounted on the furnace 12. Light is projected from a light source in a housing 14, through a pressurized inspection housing 13 into the furnace 12. A portion of this light is reflected by a mirror 19 onto a photocell 35. Light reflected from the contents of the furnace 12 also strikes the photocell 35. The alternating component of the output of the photocell 35 is amplified, rectified and utilized to fire a thyratron 47 at a desired point in the heating cycle. Firing of the thyratron 47 actuates a relay 51 to cut off the furnace power supply 53 to furnace heating elements 52, to terminate the heating cycle when the contents of the furnace have reached an optimum condition, as determined by their reflectivity.

Figure 2:
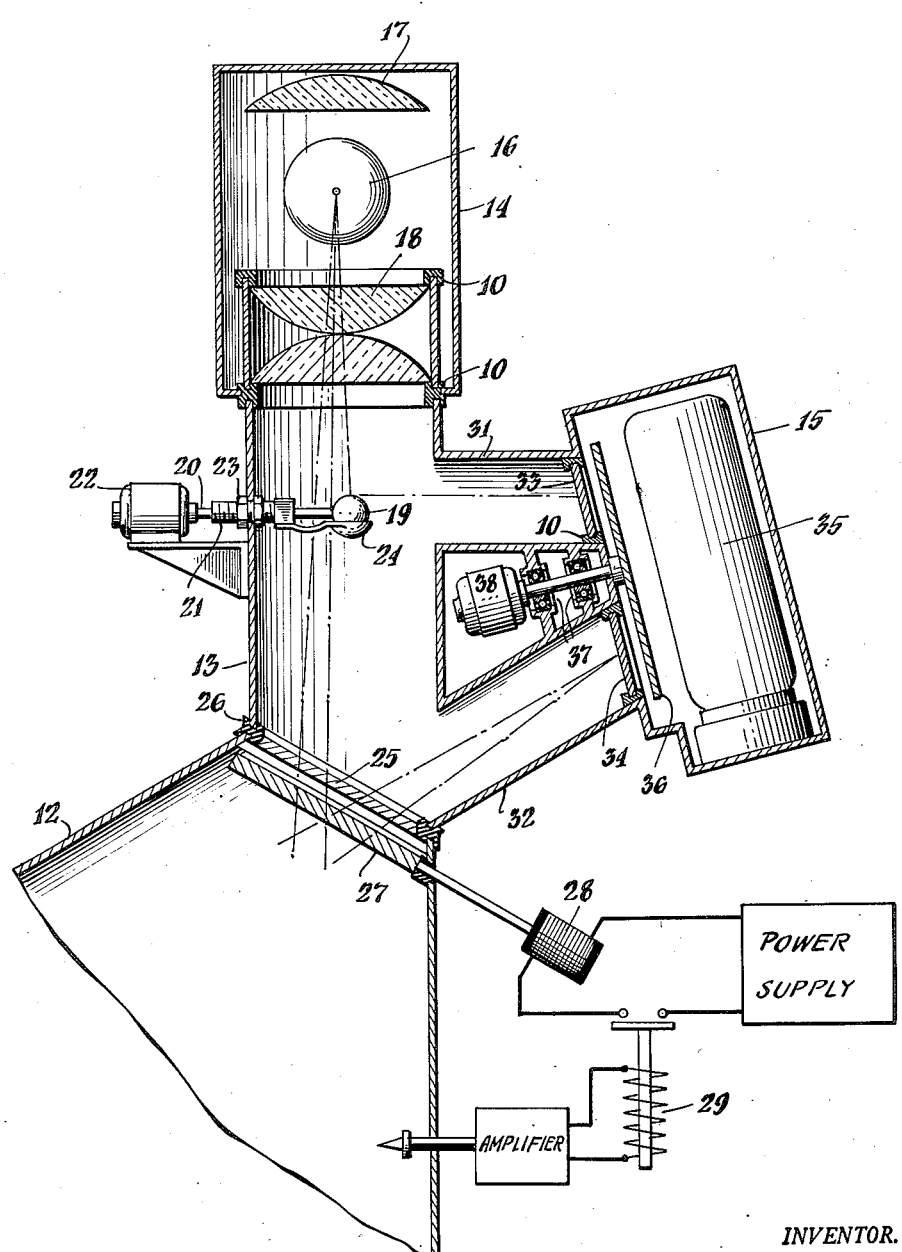
Fig. 2 is a sectional view of a preferred embodiment of the optical scanning portion of this invention.

Referring now to Fig. 2, an optical scanning system 11 is integrally mounted on the furnace or oven 12 whose contents are to be inspected, and whose heating cycle is to be controlled.

The optical scanning system itself consists of three units: the sealed, pressurized central inspection housing 13, the light source projection housing 14, and a photocell housing 15. Within the light source projection housing 14 are mounted a lamp 16, a spherical mirror 17 and a condenser lens system 18. Any suitable sealing means, such as rings 10, may be utilized to seal the housing 13 with its interior pressure substantially greater than atmospheric pressure, such pressure preferably being higher than any pressure liable to be generated in the furnace 12 during operation. Sealing of the housing 13 prevents dust or other foreign matter from entering said housing, thus eliminating errors caused by such matter.

As is most clearly shown in Fig. 2, the reflector 19 is an adjustable, rotating ball mirror positioned within the inspection housing 13, so as to intercept a portion of the projected light beam. The ball mirror 19 is rotated by a shaft 20 carried in a bearing housing or journal 21, the outer end of the shaft 20 having attached thereto a motor 22, or any other suitable source of driving power. The bearing housing 21 is threaded and calibrated on its exterior surface and may be adjusted in position longitudinally by rotation of the bearing housing 21 within a micrometer nut 23 which is attached to a wall of the housing 13. The bearing housing 21 also carries a cup 24 which serves to continuously polish the rotating ball mirror 19, thereby maintaining its reflectivity coefficient at a constant value. Adjustment of the housing 21 causes the ball mirror 19 to intercept a greater or lesser portion of the light beam, and to vary its distance from photocell 35, thus varying the intensity of the light reflected from mirror 19.

At the bottom of the inspection housing 13 is located an inspection window 25 which forms a part of the wall of the furnace 12. This inspection window is preferably formed of a filtering material which will block heat radiation from the furnace. In addition, a ring 26 of thermal and shock insulating and sealing material is placed between the walls of the inspection housing 13 and the furnace 12.

The inspection window 25 is isolated from the furnace 12 during the major portion of the heating cycle by means of a thermal insulating light gate 27 located within the furnace. The gate 27 may be in the form of an iris diaphragm, a hinged disc, a shutter, or any other suitable form well known in the art. A gate operating mechanism 28 is utilized to uncover the inspection window 25 at the desired point in the heating cycle. The gate operator 28 may take any suitable form, depending on the type of gate used. For controlling the gate operator 28 there is provided an adjustable relay 29 actuated by a thermocouple 30, positioned within the furnace, so that the window is uncovered when the temperature of the furnace reaches a predetermined value. If desired, a thermal shield may be placed around the gate operator 28 and the relay 29, and these elements may be positioned within the furnace.

One side of the pressurized inspection housing 13 is divided into two separated sections or light shafts 31 and 32 terminating respectively in light polarizing windows 33, 34. The light polarizing windows 33, 34 have their optical axes 90 degrees apart and form seal mounted windows in the wall of the photocell housing 15. Mounted within the housing 15 is the photocell 35 with its associated electrical connections, and a rotating shutter in the form of a light polarizing disc 36. The shaft of disc 36 is supported by bearings 37, 37 in the open space between the light shafts 31 and 32, and it is adapted for rotation by a motor 38 or by any other suitable source of power such as that utilized to drive the mirror shaft 20.

Separation from the central inspection housing 13 of the only two elements of the optical system likely to require replacement, namely the lamp 16 and the photocell 35, enables the permanent, pressurized sealing of the inspection housing 13, which in turn is the only portion of the optical system exposed to heat and vapors from the furnace 12. In practice it is desirable to seal the housing 13 with its internal pressure considerably in excess of any pressure likely to be generated within the furnace 12 so that it is impossible for any vapors from the furnace 12 to enter the housing and form condensates therein. No condensates will form on the inspection window 25, because its temperature will remain above the vaporization temperatures of the volatile components of the furnace contents. In addition, however, it may be desirable in some instances to provide means for circulating air within the furnace 12 to further prevent condensation on the inspection window 25.

In operation, power is supplied to the furnace 12 to heat the contents thereof. When the temperature of the furnace, as measured by the thermocouple 30, reaches a predetermined value, the relay 29 actuates the gate operator 28, moving the gate 27 aside and exposing the contents of the furnace 12 through the inspection window 25.

The lamp 16, mirror 17 and a condenser lens system 18 combine to project a concentrated beam of light downwardly through the inspection housing 13. A predetermined portion of this light beam is intercepted by the rotating, polished ball mirror 19 and is reflected by the mirror 19 through the light shaft 31 to strike the upper of the light polarizing windows 33. The remaining and major portion of the light beam projected from the housing 14 passes through the inspection window 25 and is reflected by the furnace contents through the inspection window and the light shaft 32 to strike the lower of the light polarizing windows 34.

The light polarizing disc 36 is rotated, thereby causing modulation of the light striking the photocell 35 through the windows 33 and 34. It is generally desirable to rotate the disc 36 at a comparatively high speed, for example, 7200 R. P. M. When the intensities of the lights striking windows 33, 34 are unequal, the net effect of rotation of the disc 36 at this speed is to modulate the light directed to the photocell 35 at a frequency of 240 cycles per second, the modulation being purely sinusoidal and resulting in the highest possible signal to noise ratio.

The ball mirror 19 is adjusted at the start of the cycle by means of the micrometer formed by the bearing housing 21 and the nut 23, so that the light reflected by the mirror onto the photocell 35 is equal in intensity to the light which will be reflected onto the photocell by the contents of the furnace 12 when these contents reach a predetermined optimum condition. The sinusoidally modulated light striking the photocell 35 at the instant when the gate 26 is open, will have its preset maximum value proportional to the intensity of the light reflected from the ball mirror 19, and its minimum value proportional to the intensity of the light reflected from the contents of the furnace.

As the heating of the furnace contents is continued, the reflectivity coefficient and hence the intensity of the light striking the photocell 35 through the shaft 32 and the lower polaroid window 34 will increase. As this intensity increases, it approaches the preset intensity of the light reflected from the mirror 19 through the light shaft 31. When this increase renders the two reflected light beams equal in intensity, the alternating component of the light striking the photocell 35 is at a minimum or null point. Further increase in the intensity of light reflected from the contents of the furnace 12 will cause a 180 degree reversal in the phase of the modulated light beam, since this intensity now exceeds the intensity of the light reflected from the mirror 19. Polishing of the ball mirror 19 by the cup 14 insures the stability of the reference light intensity, as previously set forth.

If the contents of the furnace 12 are of such nature that their reflectivity coefficient decreases during the heating cycle, then the ball mirror 19 may be adjusted so as to be initially the source of the minimum light striking the photocell 35, while the light reflected from the furnace contents furnishes the light of maximum intensity. In such a case the intensity of light reflected by the mirror 19 is still initially adjusted to be equal to the intensity of the light reflected by the furnace contents when they have reached an optimum condition.

Referring again to Fig. 1, there are shown the electronic control circuits associated with the optical scanning system 11, these circuits being designed to trigger when the intensities of the two reflected lights striking the photocell 35 are equal.

Any suitable power supply 39, preferably consisting of a transformer and a vacuum tube rectifier, is utilized to produce a steady, unidirectional voltage which is smoothed by a filter 40 and maintained at a constant value by a voltage regulator 41. The output of the voltage regulator 41 is utilized to furnish plate and filament voltages to the vacuum tubes of the electronic control circuits, although filament voltages may be supplied by means of a tap on the secondary of the transformer of the power supply 39. The voltage regulator 41 also serves to furnish voltage to bias supply 42, and preferably consists of a series of neon filled tubes.

The sinusoidally modulated light, which strikes the photocell 35 when the inspection window 25 is uncovered, produces a correspondingly sinusoidal voltage output from the photocell. The alternating component only of this voltage is fed to a cathode follower 43 which serves to prevent undue loading of the photocell circuit. It may be desirable to shock mount the cathode follower 33 and the other electronic components of the system.

Figure 3:
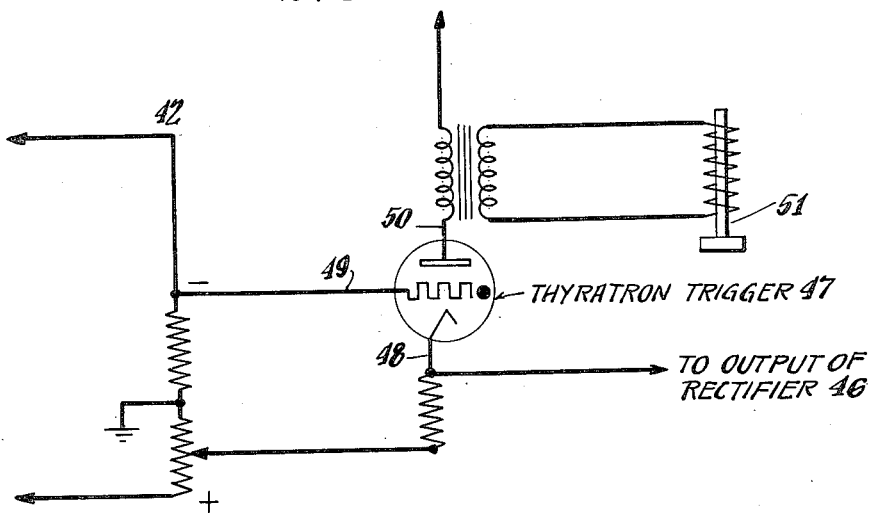
Fig. 3 is a detail circuit diagram of a preferred embodiment of the thyratron tube and its associated control circuits.
Figure 4:
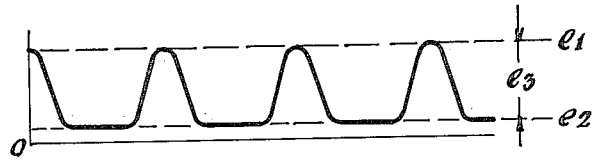
Figs. 4, 5, 6 and 7 show the output of the photocell at different times during the control cycle.

From the cathode follower 43 the signal voltage passes through a filter network 44 which serves to eliminate any signals caused by irregularities of the surface of the furnace contents, and through a two-stage, narrow band pass amplifier 45 to a full wave rectifier 46. The output of the rectifier 46 will be a unidirectional voltage whose value is proportional to the alternating component of the modulated light beam striking the photocell. As is most clearly shown in Fig. 3, this rectifier output voltage is fed to a cathode 48 of a thyratron 47 to cause the thyratron to be in a cut-off condition at the start of the cycle. The plate 50 of the thyratron 47 is maintained at a constant voltage by the voltage regulator 41, and the grid 49 of the thyratron 47 is maintained at a constant voltage by the bias supply 42. The thyratron 47 in the absence of a signal from the rectifier 46 is biased slightly above cut-off condition by a bias voltage supplied to its cathode 48 by the bias supply 42. The value of the cathode bias is adjustable and is preset to cancel the random noise and unavoidable amplifier distortion output of the rectifier 46.

Figure 5:
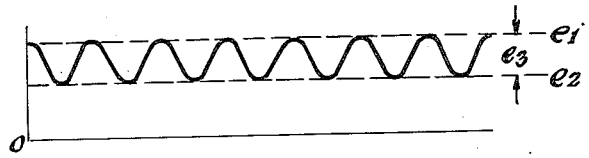

Reference is now made to Figs. 5, 6, 7 and 8, which are wave forms of the output of the photocell 35. As shown in Fig. 5, with the gate 27 closed, if its upper surface has a reflectivity coefficient approximately equal to zero, the intensity of the light striking the photocell and its output voltage will be at a minimum, represented by $e_2$, during half of the cycle of rotation of the polaroid disc 36, and will rise to a maximum $e_1$, determined by the setting of the ball mirror 19, during alternate half cycles. Thus the output of the photocell 35 has an alternating component represented by $e_3$. This alternating component, when rectified by the rectifier 46 and applied to the cathode 48 of the thyratron 50, is of a magnitude more than sufficient to bias the thyratron below cut-off.

Figure 6:
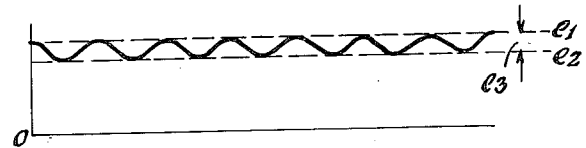

When the gate 27 is opened, the output of the photocell 35 will be, as shown in Fig. 6, a full sinusoidal wave of decreased amplitude, whose maximum, $e_1$, is determnied by the ball mirror 19 and whose minimum, $e_2$, is determined by the reflectivity coefficient of the contents of the furnace. If desired, the upper surface of gate 27 may be designed to reflect light to the photocell of an intensity approximately equal to that reflected by the furnace contents when the gate 27 is first opened, in which case the output of the photocell will take the form shown in Fig. 6 when the gate 27 is closed, rather than that shown in Fig. 5.

The alternating component $e_3$ of the output of the photocell 35 when the light gate 27 is first opened, is still more than sufficient, when rectified, to maintain the thyratron 47 in a cut-off state. As the light reflected by the furnace contents increases in intensity, $e_2$ increases, and hence $e_3$ decreases, as shown in Fig. 7.

Figure 7:
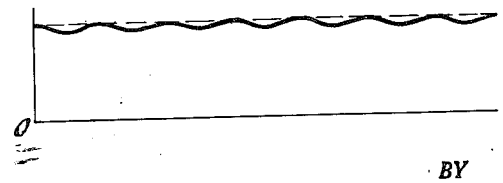

As hereinbefore explained, when the intensities of the two reflected lights striking the photocell 35 are equal, its sinusoidal output will be at a null point or minimum, as represented in Fig. 7. The output of the rectifier 46 will correspondingly decrease to a minimum, and, if the bias on the cathode 48 has been properly adjusted, the thyratron 47 will fire or conduct exactly at this desired point in the sensing cycle. Located in the output circuit of the thyratron 47 are furnace control relays 51 which operate to cut off a furnace power supply 53 from furnace heaters 52, and which may be utilized also to control the power supply for the gate operator, the optical scanning system, or any other associated elements.

It is here pointed out that if during the period of optical scanning, any element, for example, the photocell 35 or the lamp 16, fails to function, the rectifier output drops to a minimum, the thyratron 47 is immediately fired, and the control relays 51 are simultaneously actuated to prevent overheating of the furnace contents. The above described system is also independent of the frequency of light modulation and eliminates entirely the requirements for any synchronous motor or synchronous tube phasing.

While only a single specific form of the invention is illustrated and described, various changes and modifications may be made thereto without departing from the spirit of the invention as defined by the appended claims.

What I claim as new and for which I desire to secure Letters Patent of the United States, is:

1. In an optical scanning system, an inspection housing, a light projector for directing a beam of light through said housing, a spherical mirror adjustably positioned within said housing in the path of said light beam, a support for rotating said mirror, a stationary cup in contact with a portion of said mirror, a window in said housing for light communication between said housing and the objects being scanned, a light sensitive device, and means for alternately directing light from said mirror and from the objects being scanned to said light sensitive device.

2. In an optical scanning system, an inspection housing having its interior pressure substantially higher than atmospheric pressure, a light source removably positioned on the exterior of said inspection housing, a light projector for projecting a beam of light from said source through said housing, an inspection window in the end of said housing opposite from said light projector, a mirror adjustably positioned within said housing in the path of the said light beam, a light sensitive device removably positioned on the exterior of said housing, and a light polarizing shutter system for alternately directing light from said mirror and from the objects being scanned to said light sensitive device.

3. In an optical scanning system, a sealed inspection housing, a light source removably positioned on the exterior of said housing, a light projector for projecting a beam of light from said source through said housing, an inspection window in said housing for light communication between said housing and the objects being scanned, a spherical mirror positioned within said housing in the path of said light beam, means for rotating said mirror, a light shaft in said housing for transmitting light reflected from said mirror, a second light shaft in said housing for transmitting light reflected from said objects being scanned, a light sensitive device removably positioned at the ends of said shafts, and means for alternately directing the lights transmitted through said shafts to said light sensitive device.

4. In an apparatus for scanning the contents of a furnace, a furnace, a sealed and pressurized inspection housing mounted on said furnace, a window separating said furnace from said inspection housing, a light source removably positioned on said housing, a light projector for projecting light from said source through said housing and said window, a ball mirror adjustably positioned within said housing in the path of said projected light, a supporting element for rotating said ball mirror, a stationary polisher for said ball mirror, a shaft in said housing to transmit light reflected from said mirror, a second shaft in said housing to transmit light reflected from the contents of said furnace, light polarizing windows in the ends of said shafts, said polaroid windows having their optical axes spaced ninety degrees apart, a light polarizing disc adjacent to said shaft windows, a supporting shaft for said light polarizing disc, means to rotate said shaft, and a light sensitive device removably positioned adjacent said shaft ends to receive light from said shafts through said windows and said disc.

5. In a furnace scanning system, a furnace, an optical scanning system, a sealed and pressurized housing for said scanning system mounted on said furnace, a thermal shield between said furnace and said housing, electrically operated means for moving said shield, and means responsive to furnace temperature for energizing said electrically operated means when the interior of said furnace has reached a predetermined temperature.

LOUIS A. KING.

REFERENCES CITED

The following references are of record in the file of this patent:

UNITED STATES PATENTS

| Number | Name | Date |
|---|---|---|
| 748,346 | Cargill | Dec. 29, 1903 |
| 1,201,536 | Whitehead | Oct. 17, 1916 |
| 1,610,055 | Hornbeck | Dec. 7, 1926 |
| 1,614,466 | Gearon | Jan. 18, 1927 |
| 1,667,355 | Norton | Apr. 24, 1928 |
| 2,218,464 | Fairchild | Oct. 15, 1940 |
| 2,250,859 | Ehret | July 29, 1941 |
| 2,261,211 | Beers | Nov. 4, 1941 |
| 2,293,521 | Thom | Aug. 18, 1942 |
| 2,376,311 | Hood | May 15, 1945 |
| 2,402,719 | Allison | June 25, 1946 |
| 2,406,318 | Brace | Aug. 27, 1946 |
| 2,413,486 | Denyssen | Dec. 31, 1946 |
| 2,432,667 | Kettering | Dec. 16, 1947 |
| 2,494,607 | Bouchet | Jan. 17, 1950 |